US011310971B2

(12) United States Patent
Douseki et al.

(10) Patent No.: US 11,310,971 B2
(45) Date of Patent: Apr. 26, 2022

(54) PLANT CULTIVATION SYSTEM, CONTROLLER, AND PLANT CULTIVATION METHOD

(71) Applicants: The Ritsumeikan Trust, Kyoto (JP); ABLIC Inc., Tokyo (JP)

(72) Inventors: Takakuni Douseki, Shiga (JP); Ami Tanaka, Shiga (JP); Syuuichi Okamoto, Shiga (JP); Ryoma Furumori, Shiga (JP); Fumiyasu Utsunomiya, Tokyo (JP)

(73) Assignees: The Ritsumeikan Trust, Kyoto (JP); ABLIC Inc., Tokyo (JP)

( * ) Notice: Subject to any disclaimer, the term of this patent is extended or adjusted under 35 U.S.C. 154(b) by 0 days.

(21) Appl. No.: 17/177,738

(22) Filed: Feb. 17, 2021

(65) Prior Publication Data

US 2021/0251160 A1 Aug. 19, 2021

(30) Foreign Application Priority Data

Feb. 18, 2020 (JP) .............................. JP2020-025628

(51) Int. Cl.
*A01G 27/00* (2006.01)
*A01G 9/24* (2006.01)

(52) U.S. Cl.
CPC .......... *A01G 27/003* (2013.01); *A01G 9/247* (2013.01); *A01G 27/008* (2013.01)

(58) Field of Classification Search
CPC . A01G 9/247; A01G 9/26; A01G 9/24; A01G 27/003; A01G 27/008
See application file for complete search history.

(56) References Cited

U.S. PATENT DOCUMENTS 4,015,366 A * 4/1977 Hall, III ................... A01G 3/04
 193/25 E
4,430,828 A * 2/1984 Oglevee ................. A01G 9/246
 236/44 C
(Continued)

FOREIGN PATENT DOCUMENTS

CN 104838925 A * 8/2015
CN 206004382 U * 3/2017
(Continued)

OTHER PUBLICATIONS

English-language translation of CN 206004382 (Year: 2017).*
(Continued)

*Primary Examiner* — Lisa L Tsang
(74) *Attorney, Agent, or Firm* — Millen, White, Zelano & Branigan, P.C.; William F. Nixon

(57) ABSTRACT

A plant cultivation system includes: a first sensor configured to output a sensor signal corresponding to an amount of water in a plant; a second sensor configured to output a sensor signal corresponding to a measurement value of an environment condition; and a controller, wherein the controller is configured to, by using a sensor signal from the first sensor obtained by the first sensor measuring a plant to be cultivated and a sensor signal from the second sensor obtained by the second sensor measuring an environment for cultivating the plant to be cultivated, control a specific environment parameter corresponding to the environment condition and measured by the second sensor, in a cultivation environment for the plant to be cultivated.

9 Claims, 23 Drawing Sheets

(56) References Cited

U.S. PATENT DOCUMENTS

| | | | | |
|---|---|---|---|---|
| 4,742,475 | A * | 5/1988 | Kaiser | A01G 9/246 |
| | | | | 700/278 |
| 5,148,826 | A * | 9/1992 | Bakhshaei | A01G 25/167 |
| | | | | 137/80 |
| 9,629,313 | B1 * | 4/2017 | Grossman | A01G 25/167 |
| 10,986,789 | B1 * | 4/2021 | Roberts | A01G 9/26 |
| 2013/0306749 | A1 * | 11/2013 | O'Brien | A01G 25/16 |
| | | | | 239/11 |
| 2017/0181389 | A1 * | 6/2017 | Jain | A01B 79/005 |
| 2018/0035616 | A1 * | 2/2018 | Wagner | H05B 47/16 |
| 2018/0271029 | A1 * | 9/2018 | Hatamian | G06K 9/00 |
| 2021/0068358 | A1 * | 3/2021 | Im | A01G 9/0297 |

FOREIGN PATENT DOCUMENTS

| | | | | |
|---|---|---|---|---|
| CN | 107114218 | A | * | 9/2017 |
| CN | 108617479 | A | * | 10/2018 |
| FR | 2582811 | A1 | * | 12/1986 |
| JP | 2014-60934 | A | | 4/2014 |
| JP | 2014211407 | A | * | 11/2014 |
| KR | 20100138296 | A | * | 12/2010 |
| WO | WO-8605944 | A1 | * | 10/1986 |

OTHER PUBLICATIONS

English-language translation of JP 2014211407 (Year: 2014).*
English-language translation of KR 20100138296 (Year: 2010).*
English Translation of JP 2014-60934 A published Apr. 10, 2014.

* cited by examiner

US 11,310,971 B2

PLANT CULTIVATION SYSTEM, CONTROLLER, AND PLANT CULTIVATION METHOD

TECHNICAL FIELD

The present disclosure relates to a plant cultivation system, a controller, and a plant cultivation method. This application claims priority on Japanese Patent Application No. 2020-025628 filed on Feb. 18, 2020, the entire contents of which are incorporated herein by reference.

BACKGROUND ART

Japanese Laid-Open Patent Publication No. 2014-60934 (hereinafter, PATENT LITERATURE 1) discloses a plant supporting system in which: information of a measurement value of water is uploaded to a management apparatus at a frequency based on a measurement value of a water value of soil in which a plant is planted; and a water content level of the soil is determined by the management apparatus. As disclosed in PATENT LITERATURE 1, in a general system for managing cultivation of a plant, the environment is measured and the cultivation is managed by using the measurement value.

SUMMARY OF INVENTION

The value of the environment obtained through measurement is a value representing the environment, and does not directly represent the state of the plant being cultivated. Therefore, a cultivation system that takes the actual state of the plant into consideration is desired.

According to an embodiment, a plant cultivation system includes: a first sensor configured to output a sensor signal corresponding to an amount of water in a plant; a second sensor configured to output a sensor signal corresponding to a measurement value of an environment condition; and a controller. The controller is configured to, by using a sensor signal from the first sensor obtained by the first sensor measuring a plant to be cultivated and a sensor signal from the second sensor obtained by the second sensor measuring an environment for cultivating the plant to be cultivated, control a specific environment parameter corresponding to the environment condition and measured by the second sensor, in a cultivation environment for the plant to be cultivated.

According to another embodiment, a controller includes: a first input unit configured to receive an input of a sensor signal from a first sensor configured to output a sensor signal corresponding to an amount of water in a plant; a second input unit configured to receive an input of a sensor signal from a second sensor configured to output a sensor signal corresponding to a measurement value of an environment condition; and a processor. The processor is configured to, by using a sensor signal from the first sensor obtained by the first sensor measuring a plant to be cultivated and a sensor signal from the second sensor obtained by the second sensor measuring an environment for cultivating the plant to be cultivated, control a specific environment parameter corresponding to the environment condition and measured by the second sensor, in a cultivation environment for the plant to be cultivated.

According to another embodiment, a plant cultivation method includes: obtaining, by using a first sensor configured to output a sensor signal corresponding to an amount of water, data indicating an amount of water in a plant to be cultivated; obtaining, by using a second sensor configured to output a sensor signal corresponding to a measurement value of an environment condition, data indicating an environment condition around the plant to be cultivated; and controlling, by using the sensor signal from the first sensor and the sensor signal from the second sensor, a specific environment parameter corresponding to the environment condition and measured by the second sensor, in a cultivation environment for the plant to be cultivated.

Further details will be described as embodiments described later.

DESCRIPTION OF EMBODIMENTS

Figure 1:
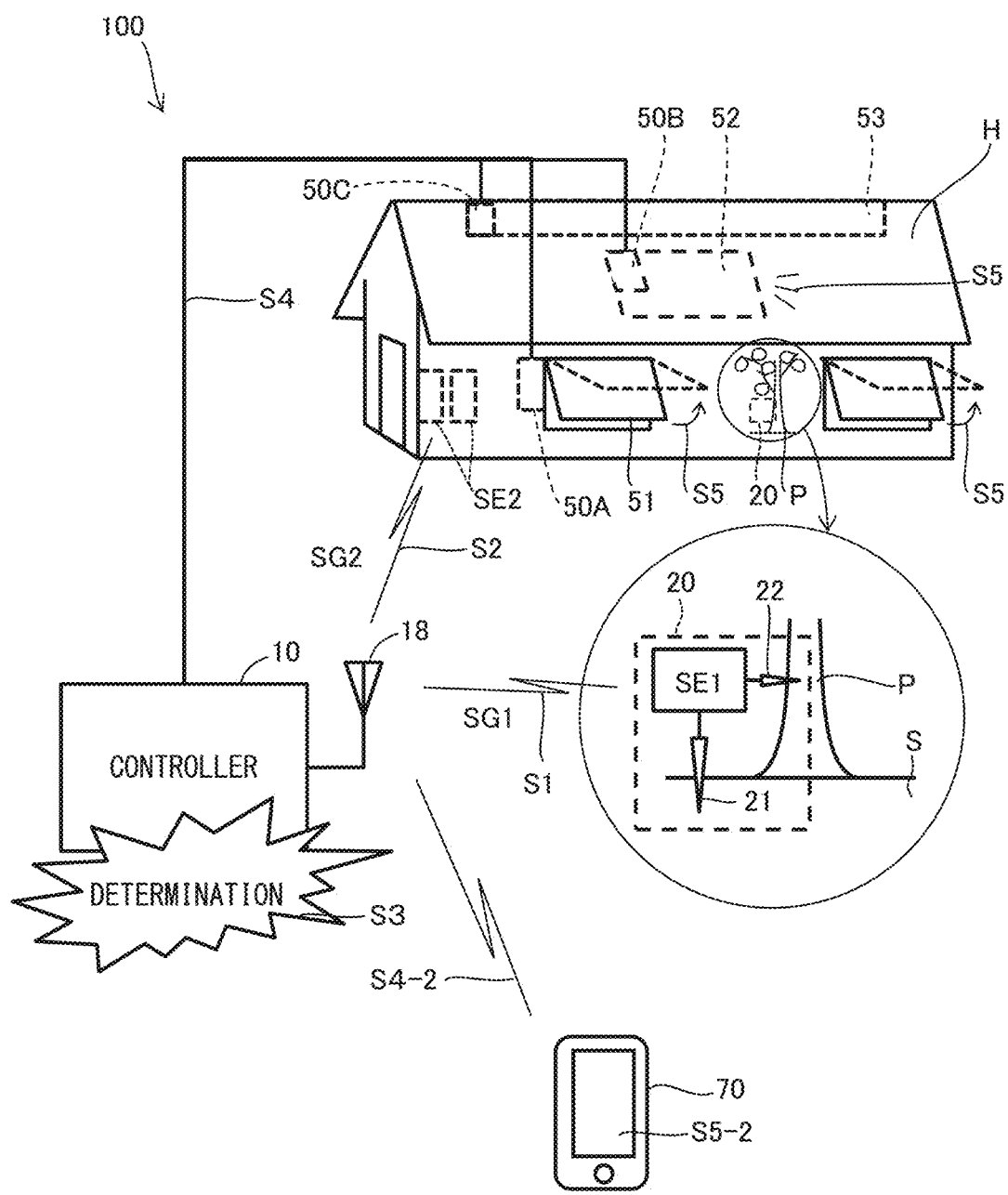
FIG. 1 is a schematic diagram of a configuration of a plant cultivation system (hereinafter, system) according to an embodiment.

<1. Outline of Plant Cultivation System, Controller, and Plant Cultivation Method>

(1) A plant cultivation system according to the present embodiment includes: a first sensor configured to output a sensor signal corresponding to an amount of water in a plant; a second sensor configured to output a sensor signal corresponding to a measurement value of an environment condition; and a controller. The controller is configured to, by using a sensor signal from the first sensor obtained by the first sensor measuring a plant to be cultivated and a sensor signal from the second sensor obtained by the second sensor measuring an environment for cultivating the plant to be cultivated, control a specific environment parameter corresponding to the environment condition and measured by the second sensor, in a cultivation environment for the plant to be cultivated.

Since the first sensor and the second sensor are used, whether or not the environment parameter is appropriate is determined by using a measurement value indicating the actual state of the plant to be cultivated, in addition to a measurement value of the environment condition. Accordingly, the plant cultivation system can perform cultivation management in consideration of the actual state of the plant.

(2) Preferably, the first sensor includes a first electrode and a second electrode, and the outputting of the sensor signal corresponding to the amount of water includes outputting the sensor signal at a time interval corresponding to an amount of electric energy generated due to an electrolyte in water present between the first electrode and the second electrode. Accordingly, the plant cultivation system can measure the status of the plant to be cultivated, in terms of the time interval.

(3) Preferably, at least one of the first electrode and the second electrode is configured to be mounted to the plant to be cultivated. Accordingly, the plant cultivation system can obtain the amount of water in the plant to be cultivated.

(4) Preferably, one of the first electrode and the second electrode is configured to be mounted to the plant to be cultivated, and another of the first electrode and the second electrode is configured to be installed in a culture medium with which the plant is cultivated. Accordingly, the plant cultivation system can obtain the amount of water in each of the plant to be cultivated and the culture medium.

(5) Preferably, the controller is configured to, with respect to the specific environment parameter, by using a first threshold for the sensor signal from the first sensor and a second threshold for the sensor signal from the second sensor, control the specific environment parameter on the basis of comparison between the sensor signal from the first sensor with the first threshold and comparison between the sensor signal from the second sensor with the second threshold. Accordingly, the plant cultivation system can perform cultivation management in consideration of the actual state of the plant.

(6) Preferably, the controller is configured to: by using the sensor signal from the first sensor and the sensor signal from the second sensor, control a first environment parameter of the specific environment parameter; and by using a sensor signal from the first sensor obtained after the control of the first environment parameter and a sensor signal from the second sensor obtained after the control of the first environment parameter, control a second environment parameter of the specific environment parameter. Accordingly, the plant cultivation system can control the second environment parameter after influence of the first environment parameter has been eliminated.

(7) Preferably, the first environment parameter and the second environment parameter are each a parameter having a correlation of a predetermined level or higher with an output of the sensor signal from the first sensor, and the correlation of the first environment parameter is higher than that of the second environment parameter. Since environment parameters having higher correlations are sequentially controlled, the plant cultivation system can adjust the environment condition with a higher accuracy.

(8) Preferably, the first environment parameter is saturation deficit of air around the plant to be cultivated. Through the measurement and analysis performed by the present inventors, the saturation deficit has been confirmed to exhibit a high correlation with the output of the sensor signal from the first sensor. Therefore, by controlling the saturation deficit first, the plant cultivation system can adjust the environment condition with a high accuracy.

(9) A controller according to the present embodiment includes: a first input unit configured to receive an input of a sensor signal from a first sensor configured to output a sensor signal corresponding to an amount of water in a plant; a second input unit configured to receive an input of a sensor signal from a second sensor configured to output a sensor signal corresponding to a measurement value of an environment condition; and a processor. The processor is configured to, by using a sensor signal from the first sensor obtained by the first sensor measuring a plant to be cultivated and a sensor signal from the second sensor obtained by the second sensor measuring an environment for cultivating the plant to be cultivated, control a specific environment parameter corresponding to the environment condition and measured by the second sensor, in a cultivation environment for the plant to be cultivated.

(10) A plant cultivation method according to the present embodiment includes: obtaining, by using a first sensor configured to output a sensor signal corresponding to an amount of water, data indicating an amount of water in a plant to be cultivated; obtaining, by using a second sensor configured to output a sensor signal corresponding to a measurement value of an environment condition, data indicating an environment condition around the plant to be cultivated; and controlling, by using the sensor signal from the first sensor and the sensor signal from the second sensor, a specific environment parameter corresponding to the environment condition and measured by the second sensor, in a cultivation environment for the plant to be cultivated. Since the first sensor and the second sensor are used, whether or not the environment parameter is appropriate is determined by using a measurement value indicating the actual state of the plant to be cultivated, in addition to a measurement value of the environment condition. When the plant cultivation method is adopted, cultivation management in consideration of the state of the actual plant can be performed. <2. Example of Plant Cultivation System, Controller, Plant Cultivation Method, and Computer Program>

First Embodiment

With reference to FIG. 1, a plant cultivation system (hereinafter, system) 100 according to the present embodiment is used to cultivate a plant P in a facility H such as a vinyl house or a plant factory. The facility H is provided with a window 51, air conditioning equipment 52, and a lighting apparatus 53, as examples of means for adjusting the cultivation environment.

The window 51 includes an adjustment unit 50A for adjusting opening/closing of the window 51. The air conditioning equipment 52 includes an adjustment unit 50B for adjusting on/off or the magnitude of air conditioning. The lighting apparatus 53 includes an adjustment unit 50C for adjusting on/off or the magnitude of lighting. The adjustment units 50A, 50B, 50C are also referred to as an adjustment unit 50 as a representative thereof. With these, the environment condition for cultivation of the plant P in the facility H is adjusted.

The environment condition for cultivation of the plant P includes one or a plurality of environment parameters. Each environment parameter is a parameter that is necessary for cultivation of the plant P and that influences the cultivation. The one or plurality of environment parameters include at least one of air temperature, soil temperature, humidity, saturation deficit, amount of solar radiation, and soil water amount.

The system 100 includes a controller 10 that controls the adjustment unit 50. The controller 10 is implemented by a computer, for example. The controller 10 is communicably connected to the adjustment unit 50. The controller 10 outputs, to the adjustment unit 50, a control signal that instructs adjustment of any one of the opening/closing, on/off, and magnitude. The controller 10 may be installed in the facility H or in the vicinity thereof. Alternatively, the controller 10 may perform communication via a communication network such as the Internet. In this case, the controller 10 may be installed at a remote place away from the facility H.

The system 100 includes a detection apparatus 20. The detection apparatus 20 measures the amount of water in the plant P. The detection apparatus 20 is installed so as to correspond to the plant P in the facility H.

Figure 2:
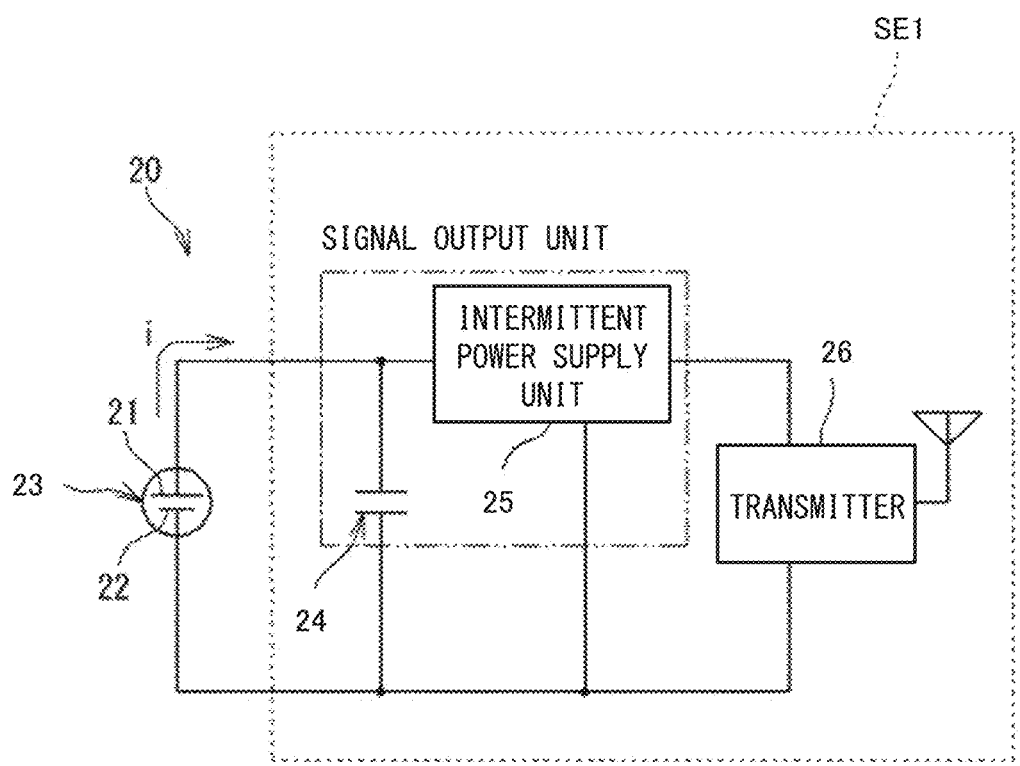
FIG. 2 is a circuit diagram of a detection apparatus included in the system.

The detection apparatus 20 includes a sensor SE1 that outputs a sensor signal SG1 corresponding to the amount of water in the plant P. Specifically, the detection apparatus 20 includes a first electrode 21 and a second electrode 22. The first electrode 21 and the second electrode 22 generate electric energy due to an electrolyte present therebetween. Thus, the first electrode 21 and the second electrode 22 function as electrodes in a chemical cell (galvanic cell) and form a power generation unit 23 (FIG. 2).

The sensor SE1 detects electric energy generated between the first electrode 21 and the second electrode 22 and outputs a sensor signal SG1 indicating the detected electric energy. The sensor signal SG1 is transmitted through, for example, wireless communication, from the sensor SE1 to the controller 10. The sensor signal SG1 may be transmitted through wired communication. The structure of the sensor SE1 will be described later.

At least one of the first electrode 21 and the second electrode 22 is mounted to the plant P. Mounting the at least one electrode to the plant P means installing the electrode so as to be in contact with the inside of the plant P. As an example, mounting the electrode to the plant P means inserting the electrode into the stem of the plant P. The first electrode 21 and the second electrode 22 are each formed in, for example, a needle-shape so as to facilitate the insertion.

As an example, the first electrode 21 is installed in a culture medium S. Specifically, the first electrode 21 is inserted from the ground surface into the ground. The first electrode 21 is installed in, for example, the vicinity of the plant P.

The second electrode 22 is mounted to the plant P. The second electrode 22 is mounted to, for example, the stem of the plant P. The second electrode 22 may be mounted to a branch of the plant P. By being inserted into the plant P, the second electrode 22 comes into contact with the sap of the plant P. In this case, the sensor signal SG1 is related to electrolytes contained in the plant P and the culture medium S present between the first electrode 21 and the second electrode 22.

As another example, both of the first electrode 21 and the second electrode 22 may be mounted to the plant P. In this case, the sensor signal SG1 is related to the electrolyte contained in the plant P.

The system 100 further includes a second sensor SE2 for measuring the environment condition. The sensor SE2 measures an environment parameter included in the environment condition. The sensor SE2 includes at least one of a thermometer, a hygrometer, and an illuminometer.

The sensor SE2 outputs a sensor signal SG2 corresponding to the value of the measured environment parameter. The sensor signal SG2 is transmitted through, for example, wireless communication, from the sensor SE2 to the controller 10. The sensor signal SG2 may be transmitted through wired communication.

The controller 10 executes arithmetic processing by using the sensor signal SG1 and the sensor signal SG2, and controls, in accordance with the processing result, the adjustment unit 50 for cultivation of the plant P. The arithmetic processing performed by the controller 10 will be described later.

The sensor SE1 performs sensing of the amount of water in the plant P. The sensing is described with reference to FIG. 2 to FIG. 7.

FIG. 2 is a schematic diagram of a circuit configuration of the sensor SE1. With reference to FIG. 2, the sensor SE1 includes a power storage unit 24. The power storage unit 24 stores electric energy (electric charge) generated between the electrodes 21 and 22.

The sensor SE1 includes an intermittent power supply unit 25. When a predetermined amount of electric charge has been stored in the power storage unit 24, the intermittent power supply unit 25 causes the electric charge to be released, thereby receiving power to operate. After the electric charge has been released from the power storage unit 24, electric charge is stored in the power storage unit 24 again by the power generation unit 23. Therefore, in the power storage unit 24, accumulation (charging) and release (discharging) of electric charge are repeatedly performed. The intermittent power supply unit 25 intermittently operates every time the power storage unit 24 performs discharging.

The sensor SE1 can transmit a detection signal by using the power generated by the power generation unit 23. Therefore, a power supply such as a battery other than the power generation unit 23 is not required.

Figure 3:
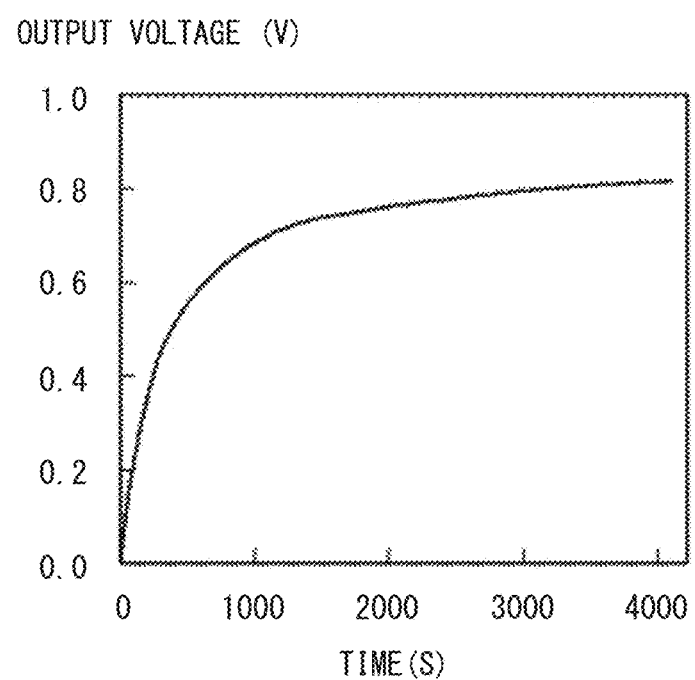
FIG. 3 shows an example of voltage characteristics of a power storage unit of a sensor.

FIG. 3 shows an example of voltage characteristics of the power storage unit 24 when power generated by the power generation unit 23 is stored in the power storage unit 24 having a power storage capacity of 10 mF. As shown in FIG. 3, the voltage of the power storage unit 24 becomes about 0.8 V after about one hour from the start.

In a case where 0.8 V is the operating voltage, when the voltage of the power storage unit 24 has exceeded 0.8 V, the intermittent power supply unit 25 outputs the power stored in the power storage unit 24 as the power supply for a transmitter 26. When the power stored in the power storage unit 24 has been consumed by the transmitter 26, power is stored again in the power storage unit 24. The time until the voltage of the power storage unit 24 reaches the operating voltage of the intermittent power supply unit 25 varies depending on the power generation amount of the power generation unit 23.

Figure 4:
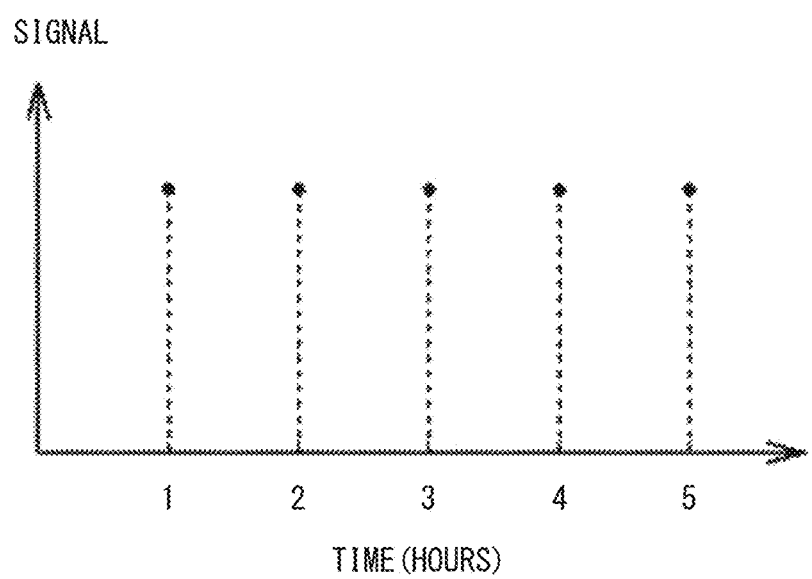
FIG. 4 shows intervals of a detection signal from the sensor.

The transmitter 26 intermittently performs a transmission operation of transmitting the sensor signal SG1 upon receiving power intermittently supplied from the intermittent power supply unit 25. FIG. 4 shows transmission of the sensor signal SG1 performed by the transmitter 26 every about one hour, for example.

Figure 5:
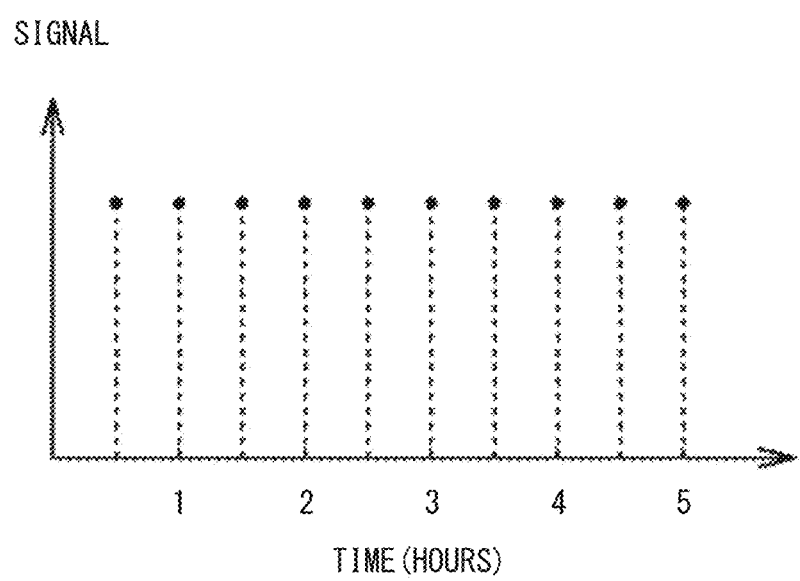
FIG. 5 shows intervals of the detection signal from the sensor.

When the power generation amount of the power generation unit 23 increases, the time necessary for storing, in the power storage unit 24, power necessary for the transmitter 26 to perform transmission becomes short. Accordingly, the transmitter 26 can frequently transmit the sensor signal SG1. For example, as shown in FIG. 5, when the power generation amount of the power generation unit 23 increases, the transmitter 26 transmits the sensor signal SG1 every about 30 minutes, for example, and the transmission interval is reduced.

Hereinafter, the interval of intermittent transmission of the sensor signal SG1 will also be referred to as a radio signal interval. The radio signal interval represents the power generation amount of the power generation unit 23. In the present embodiment, the sensor signal SG1 that is intermittently transmitted is regarded as a detection signal of electric energy generated by the power generation unit 23.

Figure 6:
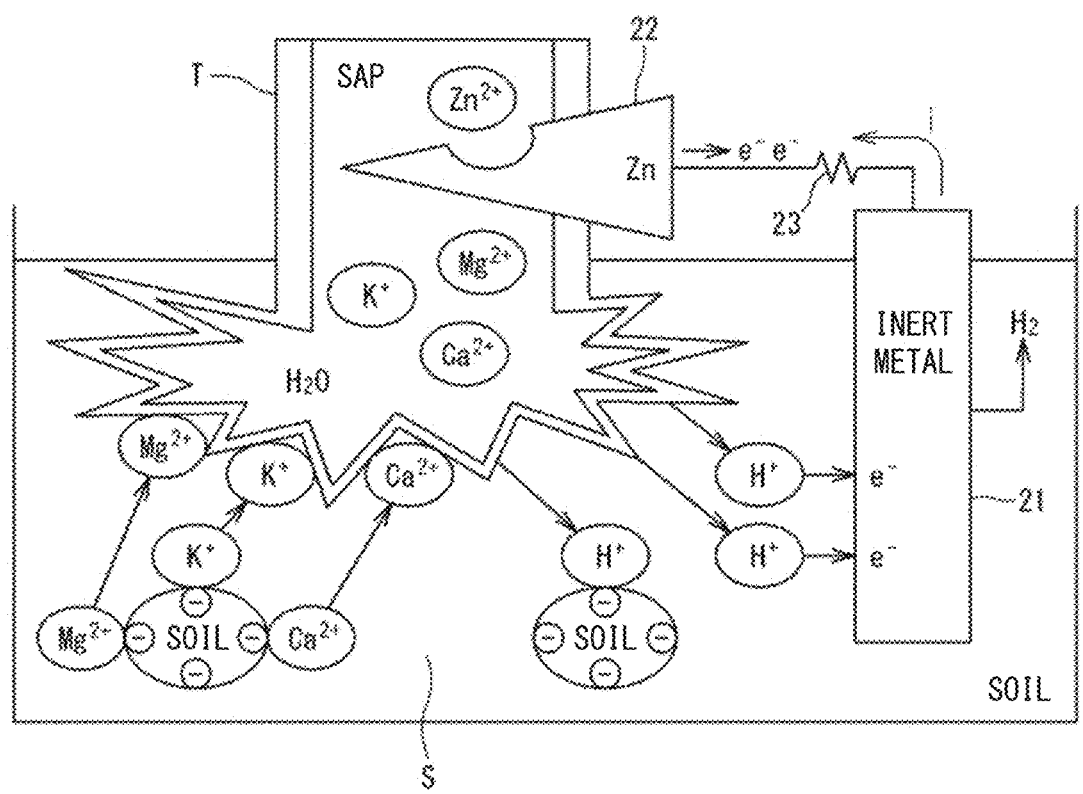
FIG. 6 is a diagram illustrating a principle of power generation in the sensor.

FIG. 6 shows a principle of power generation performed by the power generation unit 23. The first electrode 21 installed in the culture medium S is a cathode. The first electrode 21 is formed by an inert metal such as stainless steel. The second electrode 22 mounted to the plant P is an anode. The second electrode 22 includes an active material. The active material is Zn, for example.

In general, the culture medium S is negatively charged and has adsorbed thereto cations ($K^+$, $Ca^{2+}$, $Mg^{2+}$, etc.) in the soil. Cations are absorbed through ion exchange from roots of the plant P, and hydrogen ions in the sap of the plant P are released into the culture medium S. The cations absorbed in the plant P serve as nutrients for the plant P.

The second electrode (Zn) 22 inserted in the plant P is oxidized to become Zn ions and dissolved in the sap. Accordingly, electrons flow from the second electrode 22 to the first electrode 21. The hydrogen ions released into the soil are reduced to hydrogen at the first electrode 21, by the electrons having flowed from the second electrode 22. Therefore, the amount of power generation by the power generation unit 23 is dependent on the amount of hydrogen ions in the sap of the plant P and the culture medium S.

The amount of power generation by the power generation unit 23 has dependency on the amount of water between the electrodes. For generation of electric energy, hydrogen ions in the plant P need to reach the first electrode 21. However, when the amount of water between the electrodes is small, hydrogen ions are less likely to reach the first electrode 21, resulting in decrease in the power generation amount.

Since at least one of the first electrode 21 and the second electrode 22 is installed in the plant P, variation in the power generation amount by the power generation unit 23 represents variation in the amount of water in the plant P. In addition, since the first electrode 21 and the second electrode 22 are arranged on the culture medium S side and the plant P side, respectively, variation in the power generation amount by the power generation unit 23 represents variation in the amount of water in the culture medium S and the plant P.

The more actively the plant P performs photosynthesis, the more the amount of water between the first electrode 21 and the second electrode 22, i.e., the amount of water in the plant P, increases. That is, for photosynthesis, the plant P sucks water containing cations from roots, and thus, the more actively the plant P performs photosynthesis, the more the power generation amount of the power generation unit 23 increases. Therefore, the amount of water between the electrodes also represents the cultivation status of the plant P.

As described above, when the power generation amount of the power generation unit 23 increases, the radio signal interval is reduced. Therefore, the more actively the plant P performs photosynthesis, the more the radio signal interval is reduced. That is, the radio signal interval also represents the cultivation status of the plant P.

The detection apparatus 20 is not limited to the apparatus that includes the above-described sensor SE1, as long as the detection apparatus 20 is an apparatus for measuring the amount of water in the plant P. In another example, the detection apparatus 20 may be an apparatus that includes a sap flow sensor and that measures the sap amount.

Photosynthesis of the plant P is influenced by the environment condition. For example, photosynthesis is influenced by the amount of solar radiation. Therefore, the power generation amount of the power generation unit 23 is also considered to represent the environment condition. In order to verify this consideration, with respect to a specific plant P, the present inventors measured each of a plurality of environment parameters included in the environment condition and the radio signal interval, and analyzed the relationship therebetween.

Figure 7:
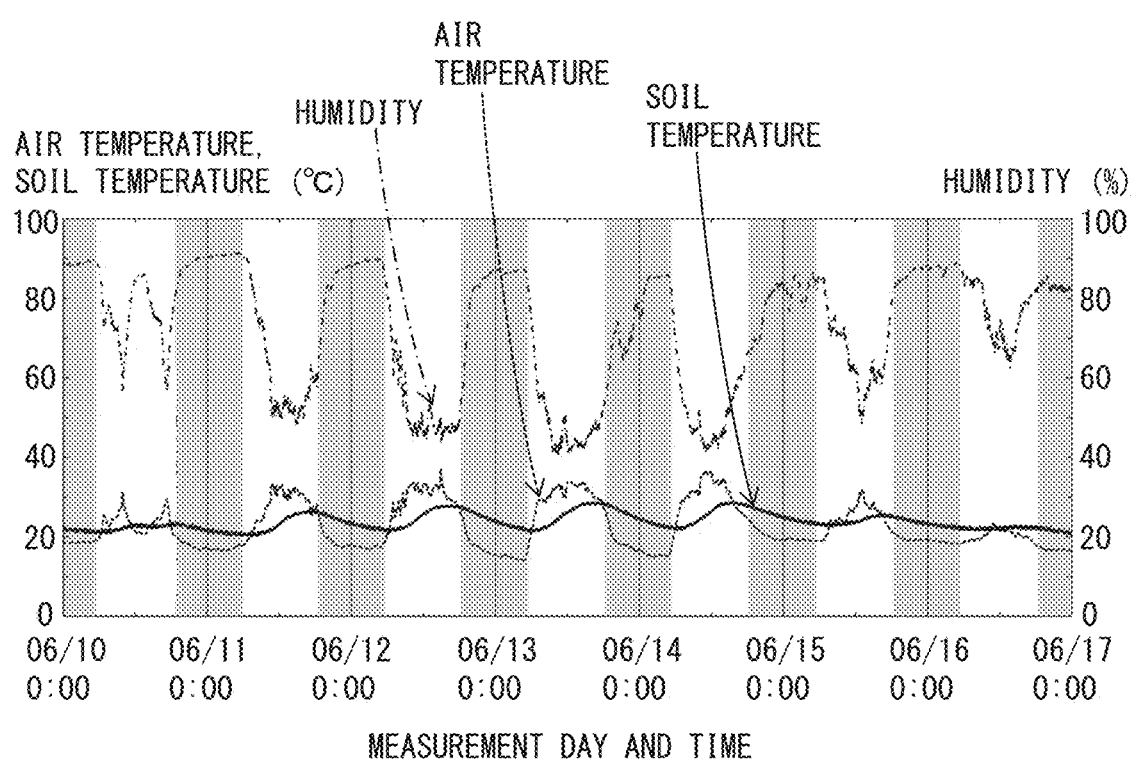
FIG. 7 shows results of measurement of air temperature, soil temperature, and humidity during cultivation of a cherry tomato.
Figure 8:
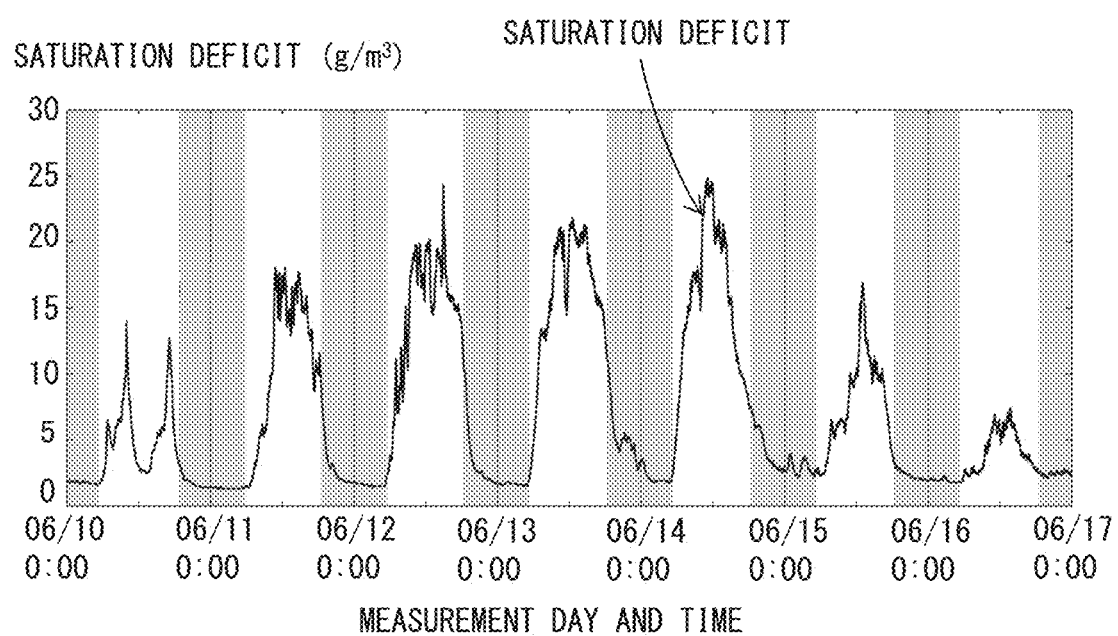
FIG. 8 shows results of measurement of saturation deficit during cultivation of the cherry tomato.
Figure 9:
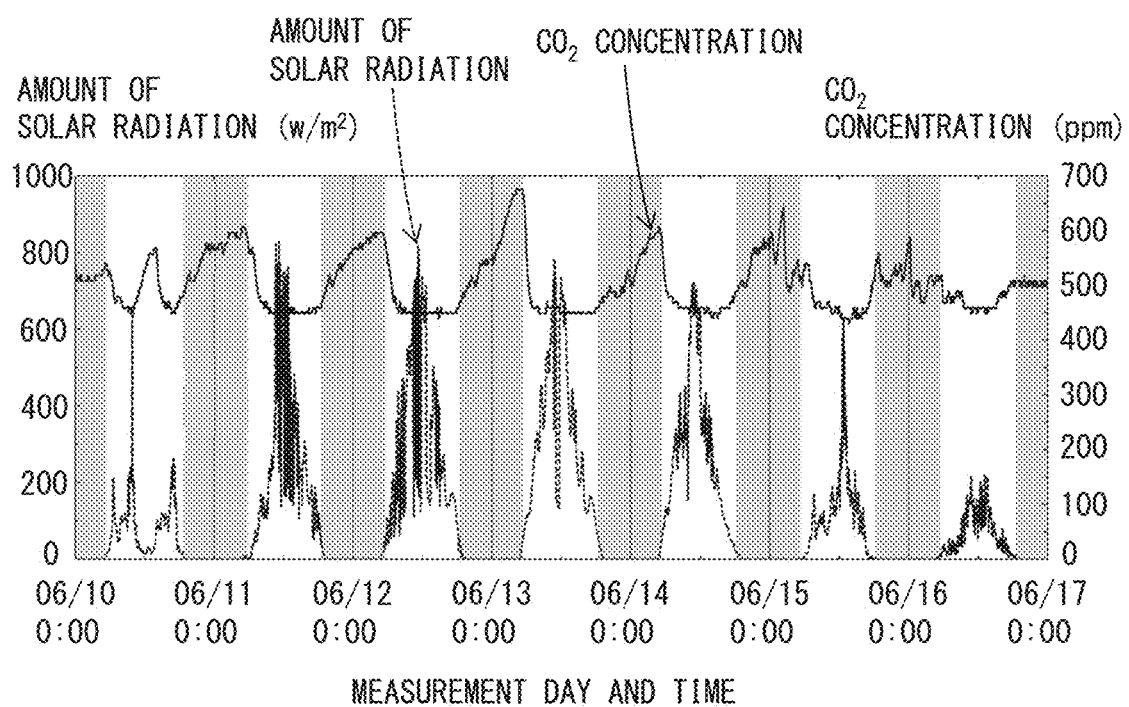
FIG. 9 shows results of measurement of the amount of solar radiation and carbon dioxide concentration during cultivation of the cherry tomato.
Figure 10:
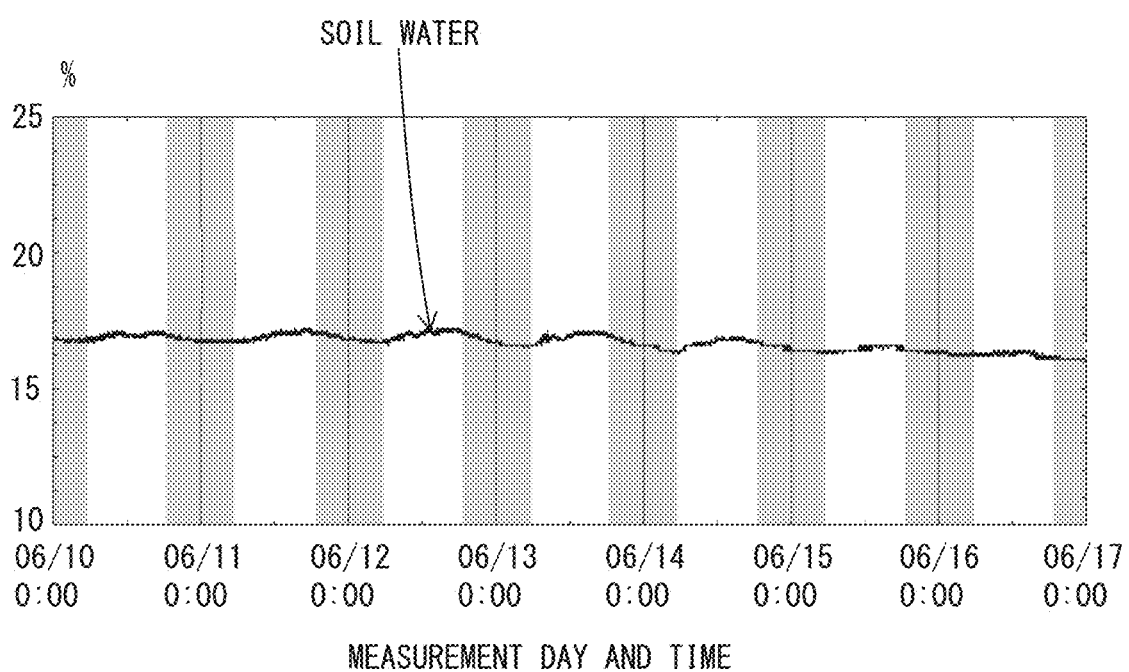
FIG. 10 shows results of measurement of the water proportion (soil water) of a culture medium during cultivation of the cherry tomato.

The present inventors used the variety "Aiko" of a cherry tomato cultivated at the facility H, as the plant P to be cultivated. First, when the plant P was in an ideal cultivation state, the present inventors measured the environment parameters for several days by using the second sensor SE2, and obtained the results shown in FIG. 7 to FIG. 10. FIG. 7 shows results of measurement of air temperature, soil temperature, and humidity. FIG. 8 shows results of measurement of saturation deficit. FIG. 9 shows results of measurement of amount of solar radiation and carbon dioxide concentration. FIG. 10 shows results of measurement of water proportion (soil water) of the culture medium S. In FIG. 7 to FIG. 10, the horizontal axis is a time axis representing the day and time, and the vertical axis represents the measurement value of each environment parameter. Each gray section in FIG. 7 to FIG. 10 represents a nighttime period from 6 p.m. to 6 a.m.

Figure 11:
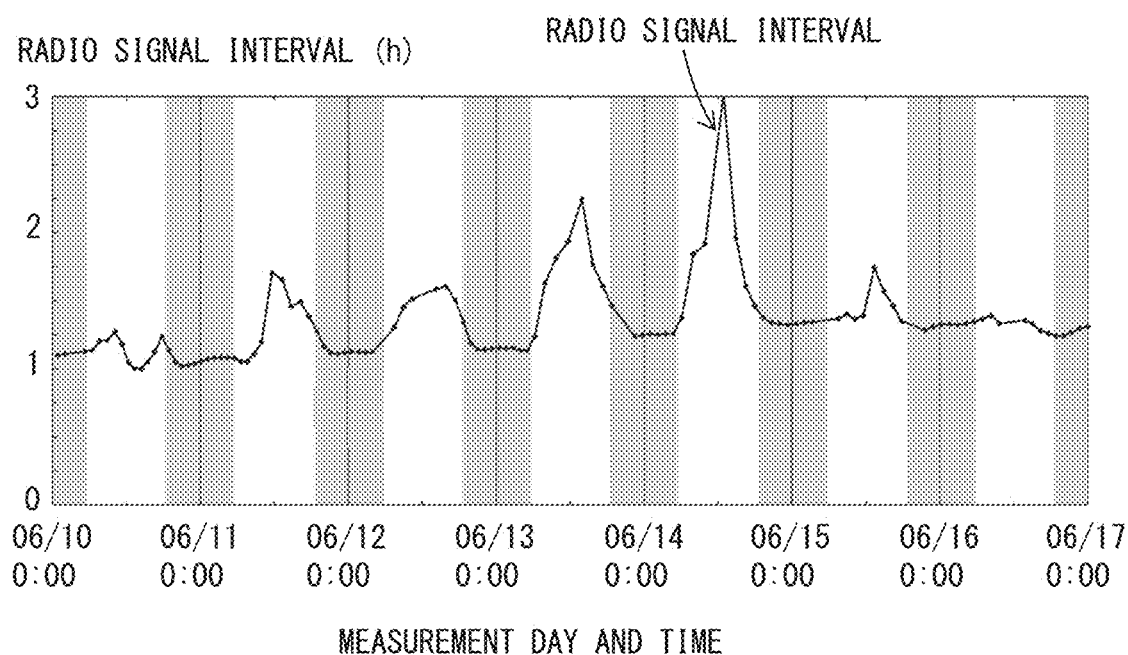
FIG. 11 shows a radio signal interval from a first sensor during cultivation of the cherry tomato.
Figure 12:
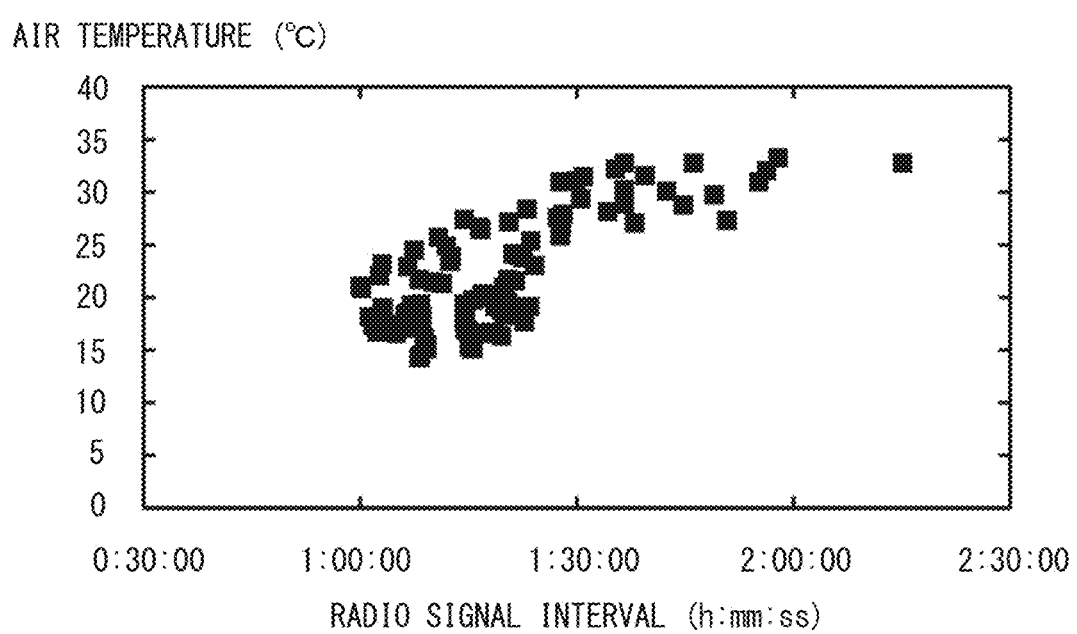
FIG. 12 shows a correlation between the air temperature shown in FIG. 7 and the radio signal interval shown in FIG. 11.
Figure 13:
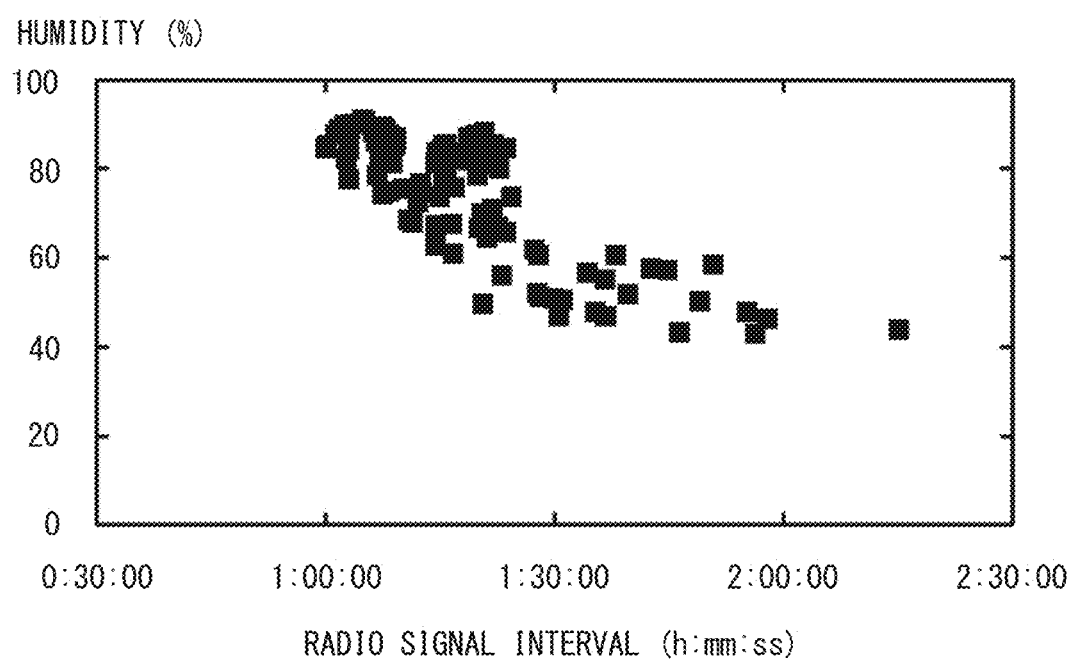
FIG. 13 shows a correlation between the humidity shown in FIG. 7 and the radio signal interval shown in FIG. 11.
Figure 14:
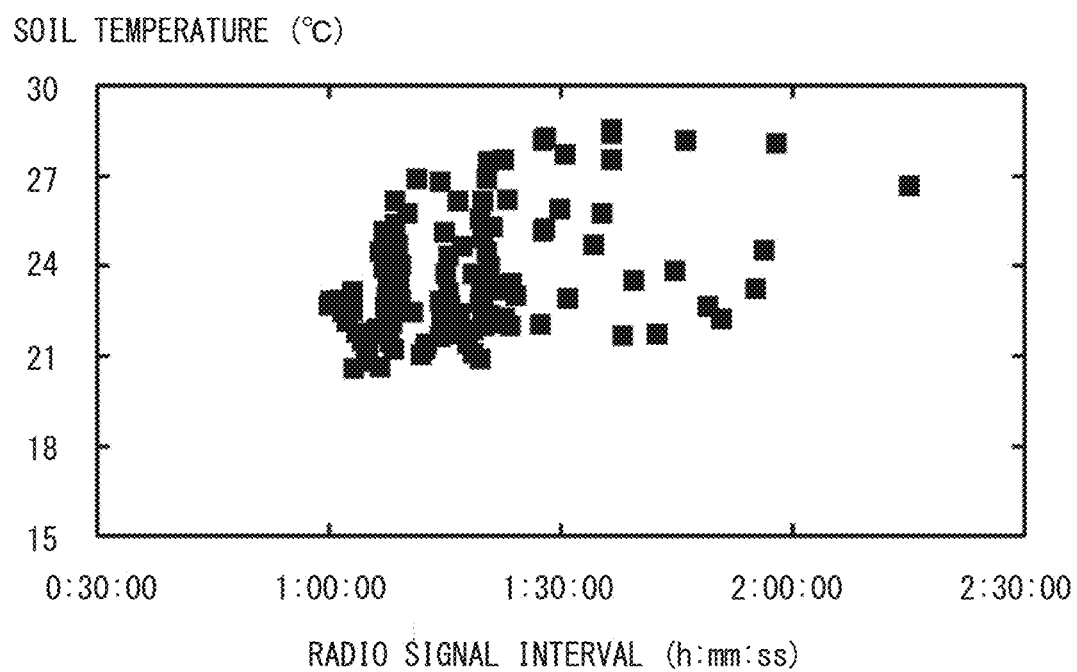
FIG. 14 shows a correlation between the soil temperature shown in FIG. 7 and the radio signal interval shown in FIG. 11.
Figure 15:
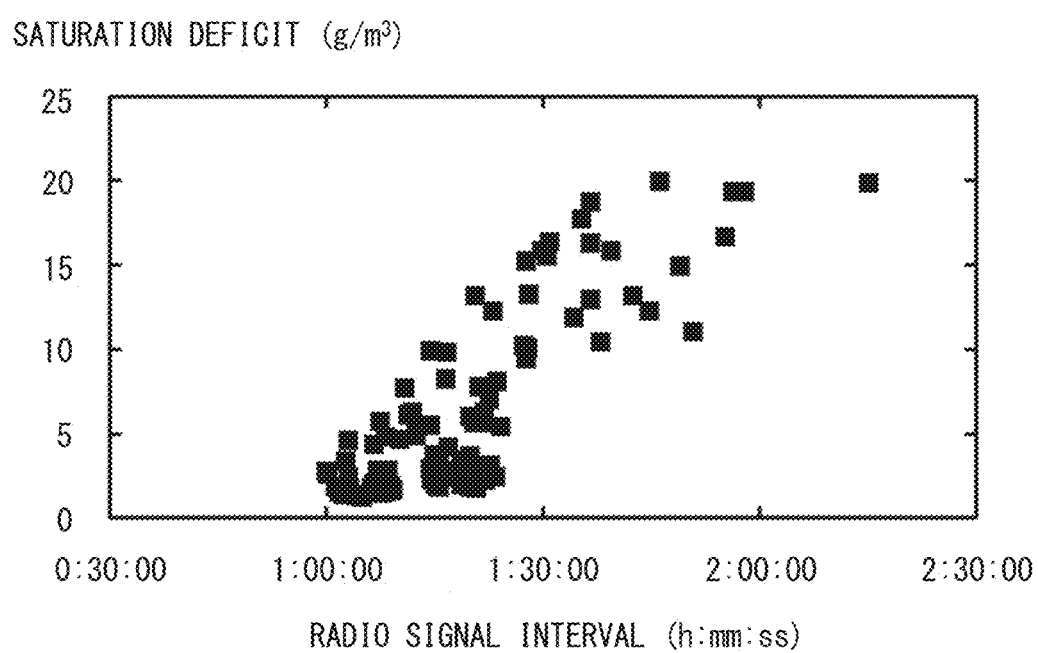
FIG. 15 shows a correlation between the saturation deficit shown in FIG. 8 and the radio signal interval shown in FIG. 11.
Figure 16:
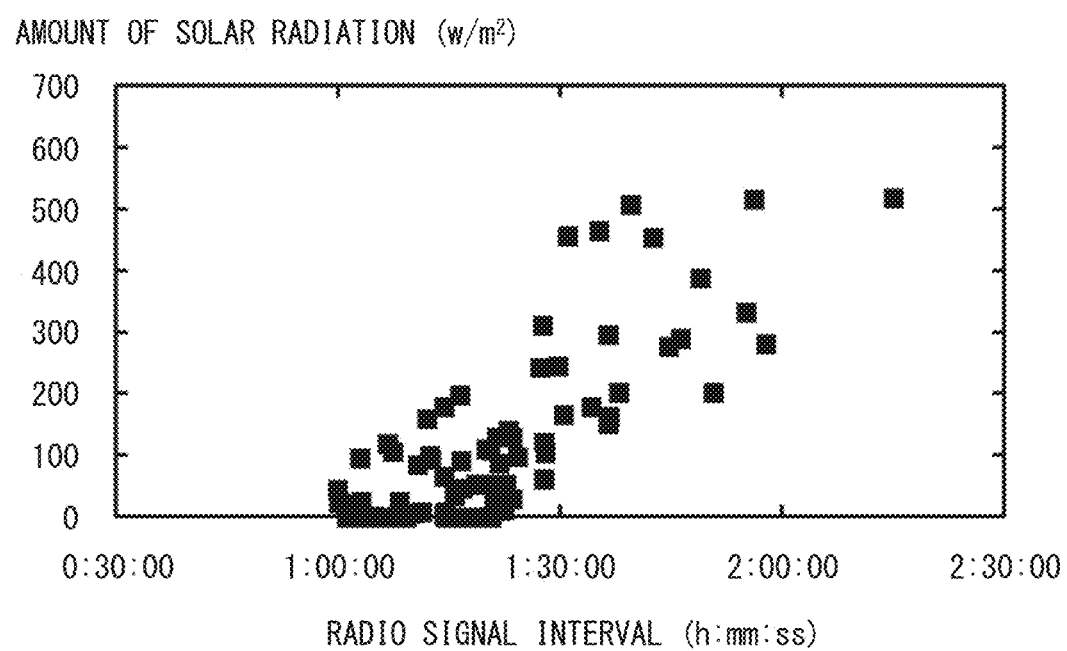
FIG. 16 shows a correlation between the amount of solar radiation shown in FIG. 9 and the radio signal interval shown in FIG. 11.
Figure 17:
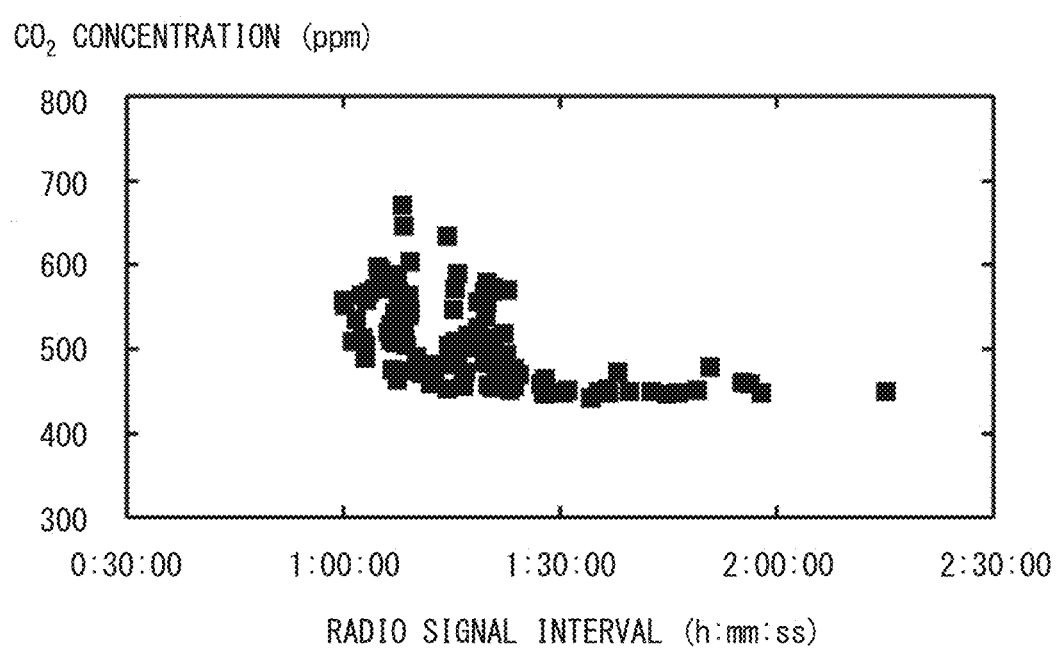
FIG. 17 shows a correlation between the carbon dioxide concentration shown in FIG. 9 and the radio signal interval shown in FIG. 11.
Figure 18:
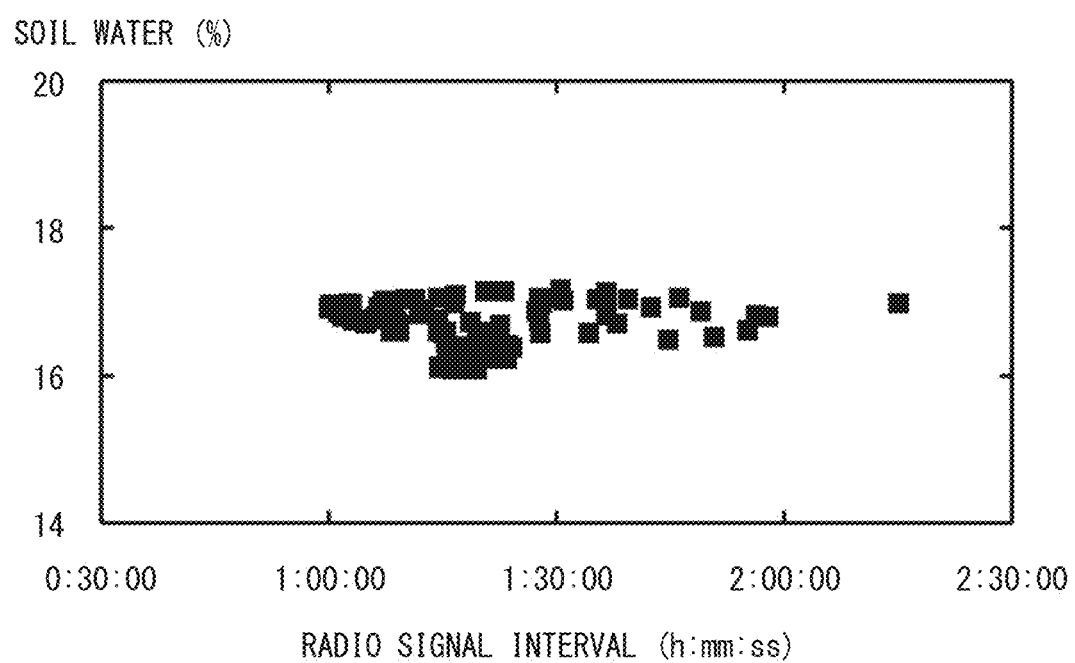
FIG. 18 shows a correlation between the soil water shown in FIG. 10 and the radio signal interval shown in FIG. 11.

In addition, when the plant P was in an ideal cultivation state, the present inventors measured the amount of water in the plant P by using the first sensor SE1 for several days, and obtained the result shown in FIG. 11. In FIG. 11, the horizontal axis is a time axis representing the day and time, and the vertical axis is a time axis representing the radio signal interval.

Each of the environment parameters shown in FIG. 7 to FIG. 10 exhibits a circadian rhythm in which increase/decrease in a one-day cycle is repeated. This is because, as shown in FIG. 9, the amount of solar radiation repeats increase/decrease in a one-day cycle, whereby each environment parameter is influenced.

With reference to FIG. 11, the radio signal interval also exhibits a circadian rhythm. This is because photosynthesis of the plant P becomes dominant during daytime and respiration becomes dominant during nighttime. Therefore, when FIG. 7 to FIG. 10 are compared with FIG. 11, it is inferred that the measurement value of each environment parameter and the radio signal interval has correlation with each other.

In order to verify this inference, the present inventors calculated a correlation value between the radio signal interval and the measurement value of each of air temperature, humidity, soil temperature, saturation deficit, amount of solar radiation, carbon dioxide concentration, and water proportion (soil water) of the culture medium S, and obtained the results shown in FIG. 12 to FIG. 18. Correlation coefficients of the respective environment parameters obtained from these results are as follows.

Air temperature: 0.737447536
Humidity: −0.763352535
Soil temperature: 0.399763803
Saturation deficit: 0.810709863
Amount of solar radiation: 0.794373128
Carbon dioxide concentration: −0.519718622
Water proportion of the culture medium S: 0.01631674

From FIG. 12 to FIG. 18 and the calculated correlation coefficients, it can be said that the saturation deficit in a range of ±0.8 to ±1.0 has a strong correlation with the radio signal interval. It can be said that the amount of solar radiation, humidity, air temperature, and carbon dioxide concentration in a range of ±0.40 to ±0.79 have medium correlations with the radio signal interval. In addition, it can be said the correlation is high in this order. It can be said that the soil temperature in a range of ±0.20 to ±0.39 has a weak correlation with the radio signal interval. It cannot be said, from the measurement result, that the water proportion of the culture medium S having a lower value than these has any correlation.

From the measurements and analysis described above, with respect to specific environment parameters included in the environment condition of the plant P to be cultivated, there is a high correlation between the ideal temporal change in the value and the radio signal interval. Thus, the system 100 is configured such that the radio signal interval obtained by the first sensor SE1 and the measurement value of the environment parameter obtained by the second sensor SE2 are used to manage the cultivation of the plant P. The arithmetic processing executed by the controller 10 is a process for managing cultivation of the plant P.

Figure 19:
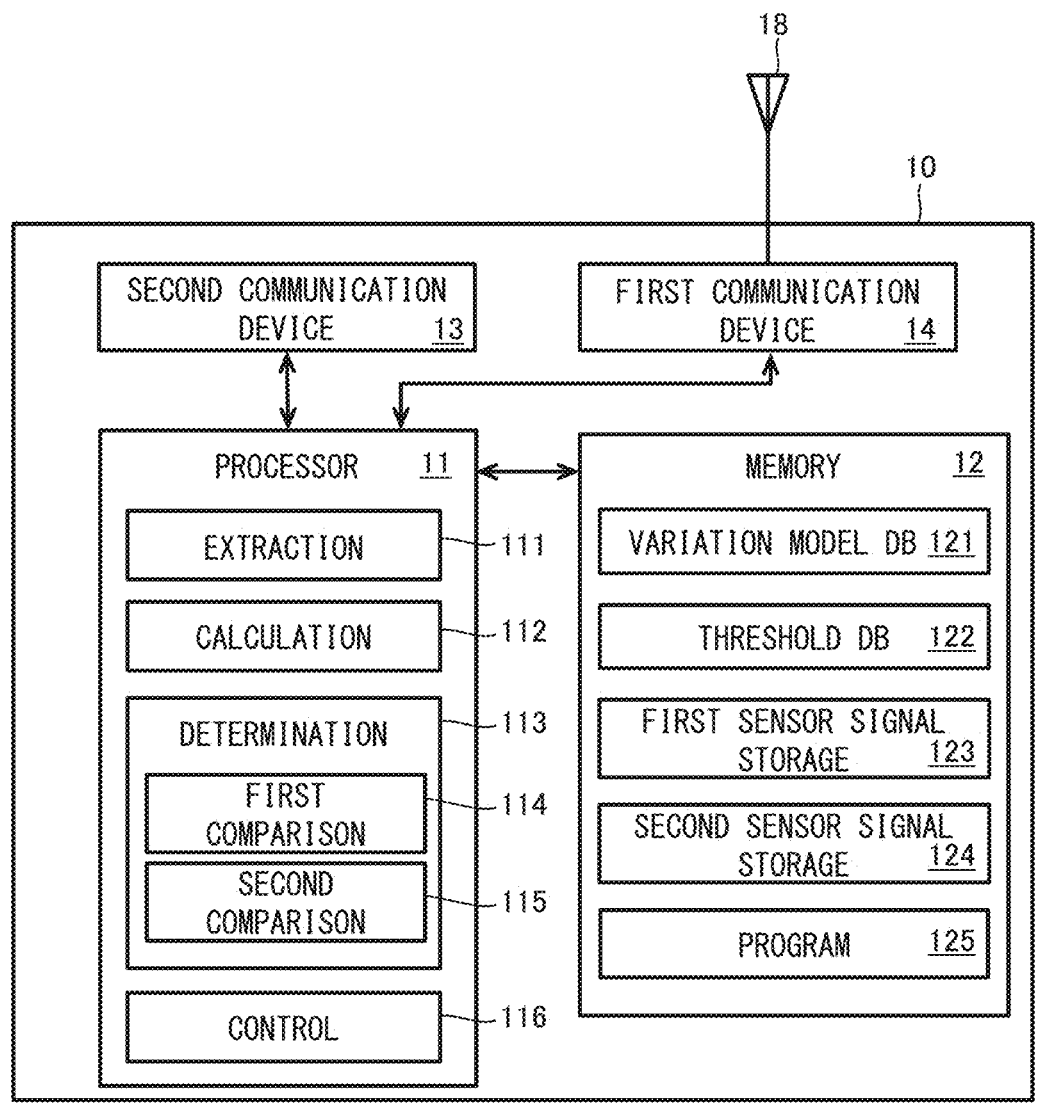
FIG. 19 is a schematic diagram showing a configuration of a controller.

With reference to FIG. 19, the controller 10 is implemented by a computer including a processor 11 and a memory 12. The memory 12 may be a primary storage device or may be a secondary storage device.

The controller 10 includes a first communication device 14 for performing wireless communication with the sensors SE1 and SE2. The first communication device 14 functions as a first input unit that receives an input of the sensor signal SG1 from the first sensor SE1. The first communication device 14 functions as a second input unit that receives an input of the sensor signal SG2 from the second sensor SE2. The controller 10 further includes a second communication device 13 for performing communication with the adjustment unit 50. The first communication device 14 and the second communication device 13 may be formed as a single communication device.

The memory 12 includes a variation model database (DB) 121. The variation model DB 121 is a database for registering model variation described later. The model variation indicates variation in the radio signal interval when the plant P to be cultivated is in an ideal cultivation state. In a case where the plant P is the variety "Aiko" of a cherry tomato, the variation model is the variation in the radio signal interval shown in FIG. 11, for example.

The model variation may be registered in advance in the memory 12, or may be updated though learning while the plant P is cultivated. The model variation may be registered in an apparatus, such as a server, that is different from the controller 10, and may be obtained by the controller 10 via a communication network such as the Internet.

The memory 12 includes a threshold DB 122. The threshold DB 122 is a database for registering, for each environment parameter, a threshold that serves as a border with respect to appropriateness/inappropriateness for cultivation of the plant P. Each threshold may be registered in advance in the memory 12, or may be updated through learning while the plant P is cultivated. The threshold may be registered in an apparatus, such as a server, that is different from the controller 10, and may be obtained by the controller 10 via a communication network such as the Internet.

The memory 12 includes: a first sensor signal storage 123, which is a storage region for storing information related to the sensor signal SG1 obtained from the first sensor SE1; and a second sensor signal storage 124, which is a storage region for storing information related to the sensor signal SG2 obtained from the second sensor SE2. The information related to the sensor signal SG1 includes data indicating a reception interval of the sensor signal SG1, and is the radio signal interval, for example. The information related to the sensor signal SG2 is a measurement value of an environment parameter, a value calculated from the measurement value, and the like.

The memory 12 stores a program 125 executed by the processor 11. The processor 11 executes the program 125, thereby executing the arithmetic processing for managing cultivation of the plant P.

The arithmetic processing executed by the processor 11 includes an extraction process 111. The extraction process 111 includes a process of extracting, from the first sensor signal storage 123 and the second sensor signal storage 124, information related to the sensor signal SG1 and information related to the sensor signal SG2 in a period for control necessary for management of cultivation of the plant P.

The arithmetic processing further includes a calculation process 112. The calculation process 112 includes a process of calculating a value of an environment parameter by using the sensor signal SG2. The processor 11 executes the calculation process 112 as necessary. For example, when the saturation deficit is used as the environment parameter, the processor 11 may calculate the value of the saturation deficit by using the temperature obtained from the thermometer and the humidity obtained from the hygrometer.

The arithmetic processing further includes a determination process 113. The determination process 113 includes a process of determining whether or not the cultivation condition of the plant P is appropriate. The determination process 113 includes a first comparison process 114 of comparing the second sensor signal SG2 with a threshold, and a second comparison process 115 of comparing the first sensor signal SG1 with a variation model. Then, in the determination process 113, the processor 11 determines whether or not the cultivation condition of the plant P is appropriate, on the basis of the result of the first comparison process 114 and the result of the second comparison process 115.

The arithmetic processing further includes a control process 116. The control process 116 includes a process of controlling the environment parameter on the basis of the determination result in the determination process 113. The process of controlling the environment parameter includes a process of: providing the second communication device 13 with a control signal for causing the adjustment unit 50, which is configured to operate a mechanism related to the target environment parameter, to perform necessary operation; and causing the second communication device 13 to transmit the control signal to the adjustment unit 50. Accordingly, the environment parameter is controlled so as to be appropriate for cultivation of the plant P in accordance with the determination result in the determination process 113.

Using FIG. 1, a cultivation method for the plant P in the present system is described. With reference to FIG. 1, in the system 100, data indicating the amount of water in the plant P is obtained by using the first sensor SE1 (step S1). The data indicating the amount of water in the plant P is obtained by measuring a reception interval of the sensor signal SG1 by the processor 11 of the controller 10.

In the system 100, data indicating an environment condition around the plant P is obtained by using the second sensor SE2 (step S2). The data indicating the environment condition around the plant P is obtained by, for example, reading out a measurement value from the sensor signal SG2 or calculating by using a value indicated by the sensor signal SG2, by the processor 11 of the controller 10.

In the system 100, whether or not an environment parameter to be controlled, in the cultivation environment for the plant P, is appropriate for cultivation is determined by using the data indicating the amount of water in the plant P and the data indicating the environment condition around the plant P (step S3). Then, the environment parameter to be controlled is controlled in accordance with the result of the determination in step S3 (step S4).

The control of the environment parameter includes at least one of decreasing the temperature, increasing the humidity, increasing the saturation deficit, and increasing the water proportion. In step S4, in order to control the environment parameter, a control signal instructing an operation is outputted to the adjustment unit 50 corresponding to the necessary mechanism. For example, when the saturation deficit is to be increased, a control signal for closing the window 51 is outputted to the adjustment unit 50A. In addition, a control signal for increasing the temperature of the air conditioning equipment 52 is outputted to the adjustment unit 50B.

In the system 100, the adjustment unit 50 operates upon receiving the control in step S4 (step S5). Accordingly, the environment parameter is controlled. In the case of the above example, the window 51 is closed and the temperature of the air conditioning equipment 52 is increased. Accordingly, the saturation deficit is increased.

The arithmetic processing performed by the controller 10 is described with reference to the flow chart shown in FIG. 20 and FIG. 21. The arithmetic processing shown in the flow chart is executed at a timing at which the environment parameter is adjusted. The timing at which the environment parameter is adjusted is, for example, at a certain time interval, at occurrence of a predetermined event, or the like. Then, data based on the sensor signal SG1 from the first sensor SE1 and data based on the sensor signal SG2 from the second sensor SE2, in a predetermined period before this timing, are respectively stored in the first sensor signal storage 123 and the second sensor signal storage 124 of the memory 12.

Figure 20:
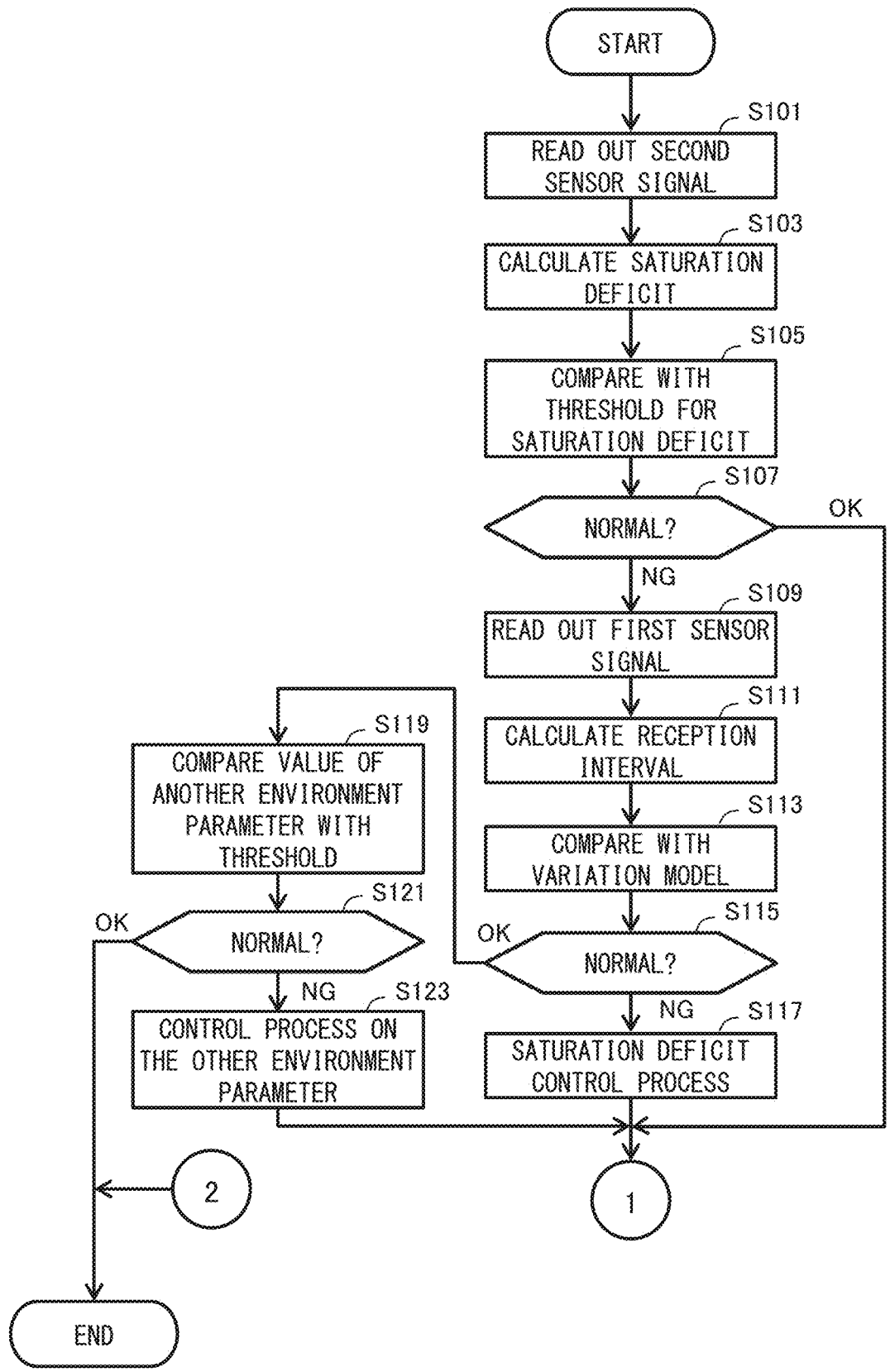
FIG. 20 is a flow chart showing a flow of arithmetic processing performed by the controller.

With reference to FIG. 20, when the control timing has come, the processor 11 of the controller 10 reads out, from the second sensor signal storage 124, data that is based on the sensor signal SG2 related to the environment parameter to be controlled and that corresponds to the period to be used in determination (step S101).

Preferably, the environment parameter to be controlled has a high correlation with the radio signal interval. On the basis of the above-described measurement and analysis performed by the present inventors, more preferably, the saturation deficit is set as the environment parameter to be controlled.

More preferably, a plurality of environment parameters included in the environment condition are set to be the targets to be controlled, and are controlled in the order of higher correlation with the radio signal interval. Therefore, in step S101 above, as the data based on the sensor signal SG2 for obtaining the saturation deficit, the processor 11 reads out measurement values, of the temperature and the humidity, that correspond to the period to be used in determination. Then, by using the read-out measurement values, the processor 11 calculates a saturation deficit corresponding to the period to be used in determination (step S103). In step S103, for example, variation in the saturation deficit corresponding to the period to be used in determination is calculated. The saturation deficit may be measured by using a saturation deficit meter. In this case, the process in step S103 is not necessary.

The processor 11 compares the calculated value of the saturation deficit with a threshold of the saturation deficit registered in the threshold DB 122 (step S105). The registered threshold of the saturation deficit is, for example, a group of thresholds of the saturation deficit corresponding to a specific period. The specific period is one day, for example, and the threshold of the saturation deficit exhibits variation in a cycle of one day shown in FIG. 8.

When deviation from the calculated or measured threshold of the saturation deficit is not less than an allowable range stored in advance, the processor 11 determines that there is a possibility that an ideal environment condition has not been established for the saturation deficit (NG in step S107). When the deviation is in the above-described allowable range, the processor 11 determines that an ideal environment condition has been established for the saturation deficit (OK in step S107).

When having determined as NG in step S107, the processor 11 reads out, from the first sensor signal storage 123, data based on the sensor signal SG1 corresponding to the period to be used in determination (step S109). Then, by using the read-out data, the processor 11 calculates a radio signal interval corresponding to the period to be used in determination (step S111).

The processor 11 compares the variation in the radio signal interval obtained in step S111 with a variation model registered in the variation model DB 121 (step S113). The registered variation model is, for example, variation in the saturation deficit corresponding to a specific period. The specific period is one day, for example, and the threshold of the saturation deficit exhibits variation in the cycle of one day shown in FIG. 11.

When deviation of the variation in the radio signal interval from the variation model is not less than an allowable range stored in advance (NG in step S115), the processor 11 executes the control on the saturation deficit as described above (step S117).

When the deviation of the variation in the radio signal interval from the variation model is in the above-described allowable range (OK in step S115), the processor 11 executes a process in consideration of a possibility of an inappropriate state for cultivation for another environment parameter. As an example, the processor 11 performs determination with respect to an environment parameter having the next highest correlation with the radio signal interval.

That is, the processor 11 reads out data based on the sensor signal SG2 to obtain a measurement value for the other environment parameter and compares the measurement value with a threshold (step S119). Step S119 is similar to steps S101 to S105. Then, when deviation of the value of the other environment parameter from the threshold is not less than an allowable range stored in advance (NG in step S121), the processor 11 controls the environment parameter (step S123).

In this manner, the processor 11 performs determination with respect to all of the environment parameters included in the environment condition. When deviation, from a threshold, of the value of all of the environment parameters is in an allowable range stored in advance (OK in step S121), the processor 11 ends the process.

When having executed the control of the environment parameter in step S117 or step S123, the processor 11 performs control on the next environment parameter. That is, the processor 11 previously stores a sequential order of performing control, and executes control according to the sequential order. An example of the sequential order of performing control is a sequential order according to a higher correlation with the radio signal interval. Another example is a sequential order that facilitates control, or a sequential order according to which cultivation of the plant P is more easily influenced.

Figure 21:
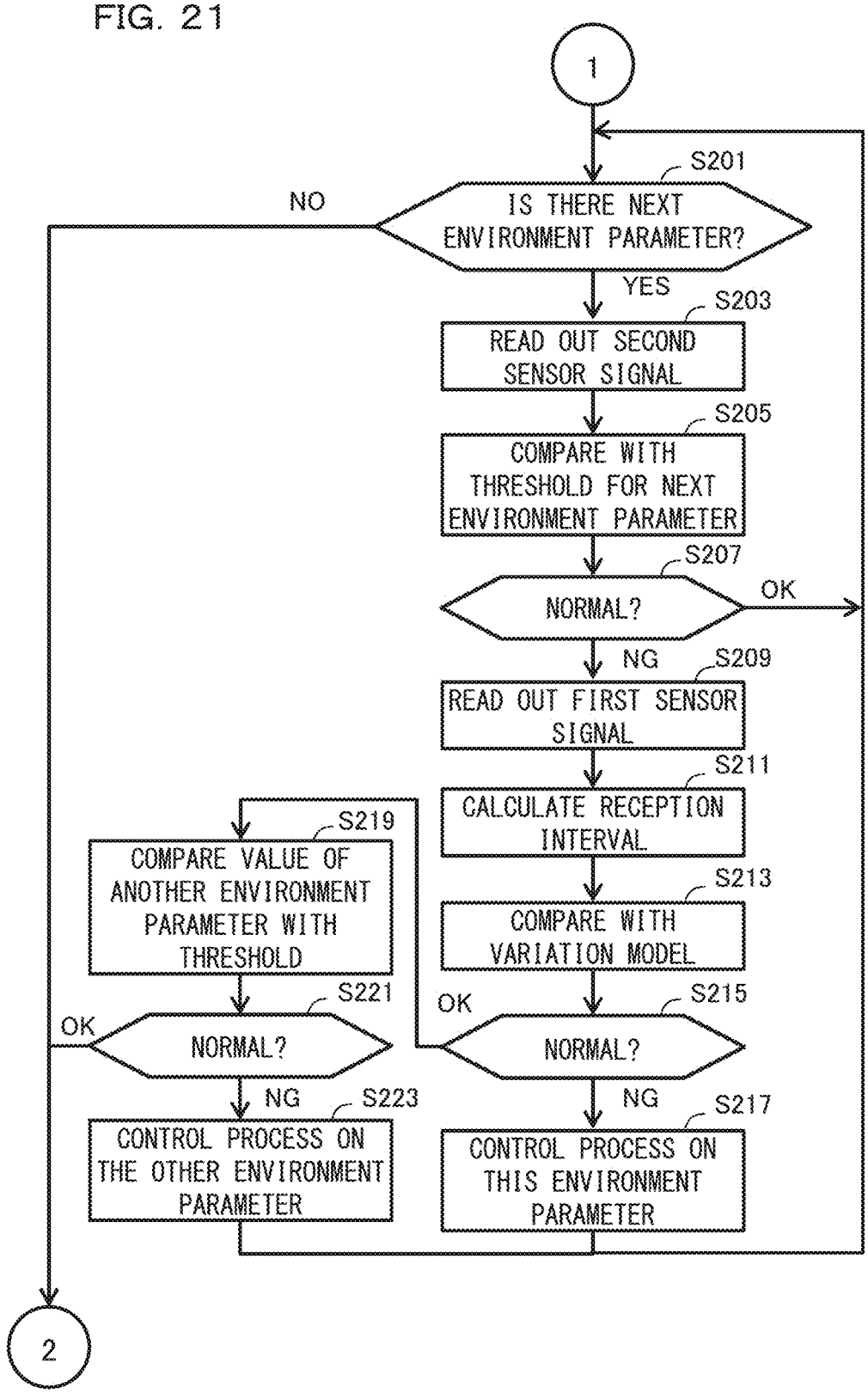
FIG. 21 is a flow chart showing a flow of arithmetic processing performed by the controller.

With reference to FIG. 21, when there is an environment parameter to be controlled next (YES in step S201), the processor 11 reads out data based on the sensor signal SG2 to obtain a measurement value of another environment parameter, and compares the measurement value with a threshold (steps S203, S205). Steps S203 and S205 are similar to steps S101 to S105. When deviation of the value of the environment parameter from the threshold is not less than an allowable range stored in advance, the processor 11 determines that there is a possibility that an ideal environment condition has not been established for the environment parameter (NG in step S207). When the deviation is in the above-described allowable range, the processor 11 determines that an ideal environment condition has been established for the saturation deficit (OK in step S207).

When having determined as NG in step S207, the processor 11 reads out, from the first sensor signal storage 123, data based on the sensor signal SG1 corresponding to the period to be used in determination (step S209). Then, by using the read-out data, the processor 11 calculates a radio signal interval corresponding to the period to be used in determination (step S211).

The calculated radio signal interval is obtained on the basis of the sensor signal SG1 measured from the plant P after the control of the environment parameter has been performed in step S117 or step S123. That is, the control has been performed such that the target environment parameter has an appropriate value in step S117 or step S123. Therefore, the sensor signal SG1 used to calculate the radio signal interval is measured from the plant P without influence of the value of the environment parameter for which there has been a possibility of non-ideal environment condition. In this manner, after an environment parameter has been controlled, whether or not control of another environment parameter is necessary is further determined. Therefore, with respect to a plurality of environment parameters, influences of environment parameters are sequentially eliminated one by one, whereby the cultivation environment for the plant P can be made appropriate.

Thereafter, the processor 11 performs processes similar to those in FIG. 20. That is, the processor 11 compares the variation in the radio signal interval obtained for the period to be used in determination, with a variation model registered in the variation model DB 121 (step S213). When deviation of the variation in the radio signal interval from the variation model is not less than an allowable range stored in advance, the processor 11 determines that an ideal environment condition has not been established for the environment parameter (NG in step S215). When having determined as NG in step S215, the processor 11 executes control on the environment parameter (step S217).

When the deviation of the variation in the radio signal interval from the variation model is in the above-described allowable range (OK in step S215), the processor 11 further obtains a measurement value for another environment parameter, and compares the measurement value with a threshold (step S219). When deviation of the value of the other environment parameter from the threshold is not less than an allowable range stored in advance (NG in step S221), the processor 11 controls the environment parameter (step S223). The processor 11 repeats the above processes for all of the environment parameters.

As described above, the present system 100 is configured such that whether or not an environment parameter is appropriate is determined by using, in addition to a measurement value of the environment condition, the radio signal interval, which is a measurement value indicating the actual state of the plant P. That is, the present system 100 enables cultivation management in consideration of the actual state of the plant.

Second Embodiment

The system 100 according to the first embodiment is configured such that the controller 10 controls the adjustment unit 50 to change the value of an actual environment parameter to an appropriate value. Instead of or in addition to this technique, cultivation management may include another technique. For example, another technique may be outputting a determination result to another apparatus.

Specifically, the system 100 according to a second embodiment may include, as another apparatus, a terminal apparatus 70 as shown in FIG. 1. As the terminal apparatus 70, a tablet terminal or the like carried by an operator who manages cultivation of the plant P is assumed, for example. In this case, as shown in FIG. 1, the controller 10 performs the determination in step S3, and transmits data indicating the result, to the terminal apparatus 70 (step S4-2).

In the terminal apparatus 70 having received the data, the determination result can be displayed on a display (step S5-2). Accordingly, the operator can know that a change needs to be made for the environment parameter. Therefore, also when this technique is adopted, the system 100 can provide an appropriate environment condition.

Third Embodiment

Figure 22:
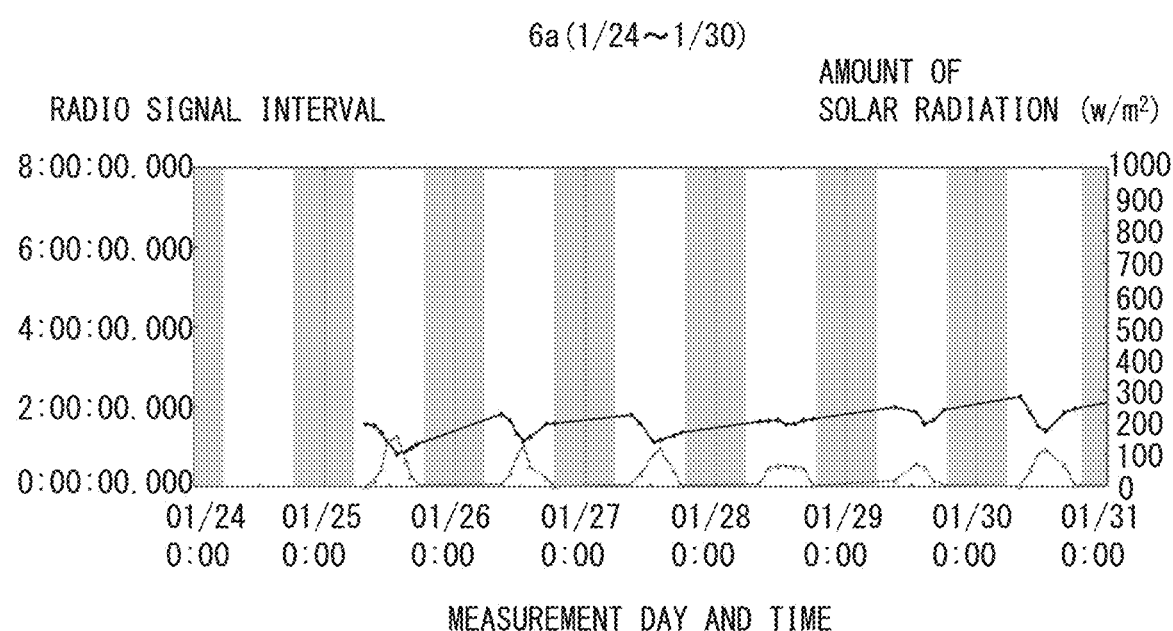
FIG. 22 shows a radio signal interval and measurement values of amount of solar radiation during daytime.
Figure 23:
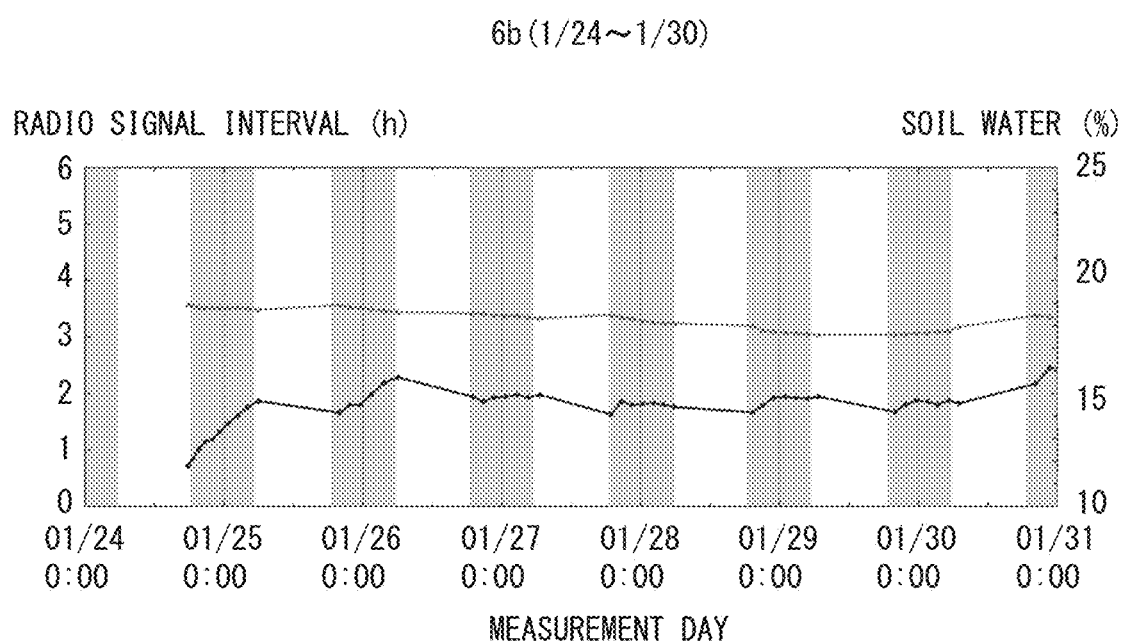
FIG. 23 shows a radio signal interval and measurement values of soil water proportion during nighttime.

The correlation coefficient between the radio signal interval and a measurement value of an environment parameter may be calculated for a specific time frame. This is because photosynthesis of the plant P and the environment parameter are both influenced by sunshine. For example, when extracted only for daytime, the radio signal interval and the measurement value of the amount of solar radiation exhibit a strong correlation as shown in FIG. 22. When extracted only for nighttime, the radio signal interval and the measurement value of the soil water proportion exhibit a strong correlation as shown in FIG. 23.

In the system 100 according to a third embodiment, a variation model is stored for each time frame in the memory 12 of the controller 10, and a variation model corresponding to a time frame of a period to be used in determination, is used.

Accordingly, the correlation coefficient can be more improved, and the accuracy of adjustment of the environment condition can be improved. <3. Additional Note>

The present invention is not limited to the above-described embodiments, and various modifications can be made.

The invention claimed is:

1. A plant cultivation system comprising:
a first sensor configured to output a sensor signal corresponding to an amount of water in a plant;
wherein the first sensor includes a first electrode and a second electrode, and
wherein the outputting of the sensor signal corresponding to the amount of water in the plant includes outputting the sensor signal at a time interval corresponding to an amount of electric energy generated due to an electrolyte in water present between the first electrode and the second electrode;
a second sensor configured to output a sensor signal corresponding to a measurement value of an environment condition; and
a controller, wherein
the controller is configured to, by using the sensor signal from the first sensor obtained by the first sensor measuring the plant, wherein the plant is to be cultivated, and the sensor signal from the second sensor obtained by the second sensor measuring an environment for cultivating the plant to be cultivated, control a specific environment parameter corresponding to the environment condition and measured by the second sensor, in the environment for cultivating the plant to be cultivated.

2. The plant cultivation system according to claim 1, wherein
at least one of the first electrode and the second electrode is configured to be mounted to the plant to be cultivated.

3. The plant cultivation system according to claim 2, wherein
the at least one of the first electrode and the second electrode is configured to be mounted to the plant to be cultivated, and another of the first electrode and the second electrode is configured to be installed in a culture medium with which the plant is cultivated.

4. The plant cultivation system according to claim 1, wherein
the controller is configured to, with respect to the specific environment parameter, by using a first threshold for the sensor signal from the first sensor and a second threshold for the sensor signal from the second sensor, control the specific environment parameter on the basis of comparison between the sensor signal from the first sensor with the first threshold and comparison between the sensor signal from the second sensor with the second threshold.

5. The plant cultivation system according to claim 1, wherein
the controller is configured to:
by using the sensor signal from the first sensor and the sensor signal from the second sensor, control a first environment parameter of the specific environment parameter; and
by using a sensor signal from the first sensor obtained after the control of the first environment parameter and a sensor signal from the second sensor obtained after the control of the first environment parameter, control a second environment parameter of the specific environment parameter.

6. The plant cultivation system according to claim 5, wherein
the first environment parameter and the second environment parameter are each a parameter having a correlation of a predetermined level or higher with an output of the sensor signal from the first sensor, and
the correlation of the first environment parameter is higher than that of the second environment parameter.

7. The plant cultivation system according to claim 5, wherein
the first environment parameter is saturation deficit of air around the plant to be cultivated.

8. A controller comprising:
a first input unit configured to receive an input of a sensor signal from a first sensor configured to output the sensor signal, the sensor signal from the first sensor corresponding to an amount of water in a plant;
wherein the first sensor includes a first electrode and a second electrode, and
wherein the outputting of the sensor signal corresponding to the amount of water in the plant includes outputting the sensor signal at a time interval corresponding to an amount of electric energy generated due to an electrolyte in water present between the first electrode and the second electrode;
a second input unit configured to receive an input of a sensor signal from a second sensor configured to output the sensor signal, the sensor signal from the second sensor corresponding to a measurement value of an environment condition; and
a processor, wherein
the processor is configured to, by using the sensor signal from the first sensor obtained by the first sensor measuring the plant, wherein the plant is to be cultivated, and the sensor signal from the second sensor obtained by the second sensor measuring an environment for cultivating the plant to be cultivated, control a specific environment parameter corresponding to the environment condition and measured by the second sensor, in the environment for cultivating the plant to be cultivated.

9. A plant cultivation method comprising:
obtaining, by using a first sensor configured to output a sensor signal corresponding to an amount of water, data indicating an amount of water in a plant to be cultivated;
wherein the first sensor includes a first electrode and a second electrode, and
wherein the outputting of the sensor signal corresponding to the amount of water in the plant includes outputting the sensor signal at a time interval corresponding to an amount of electric energy generated due to an electrolyte in water present between the first electrode and the second electrode;
obtaining, by using a second sensor configured to output a sensor signal corresponding to a measurement value of an environment condition, data indicating an environment condition around the plant to be cultivated; and
controlling, by using the sensor signal from the first sensor and the sensor signal from the second sensor, a specific environment parameter corresponding to the environment condition and measured by the second sensor, in the environment for cultivating the plant to be cultivated.

* * * * *